Patented Jan. 6, 1942

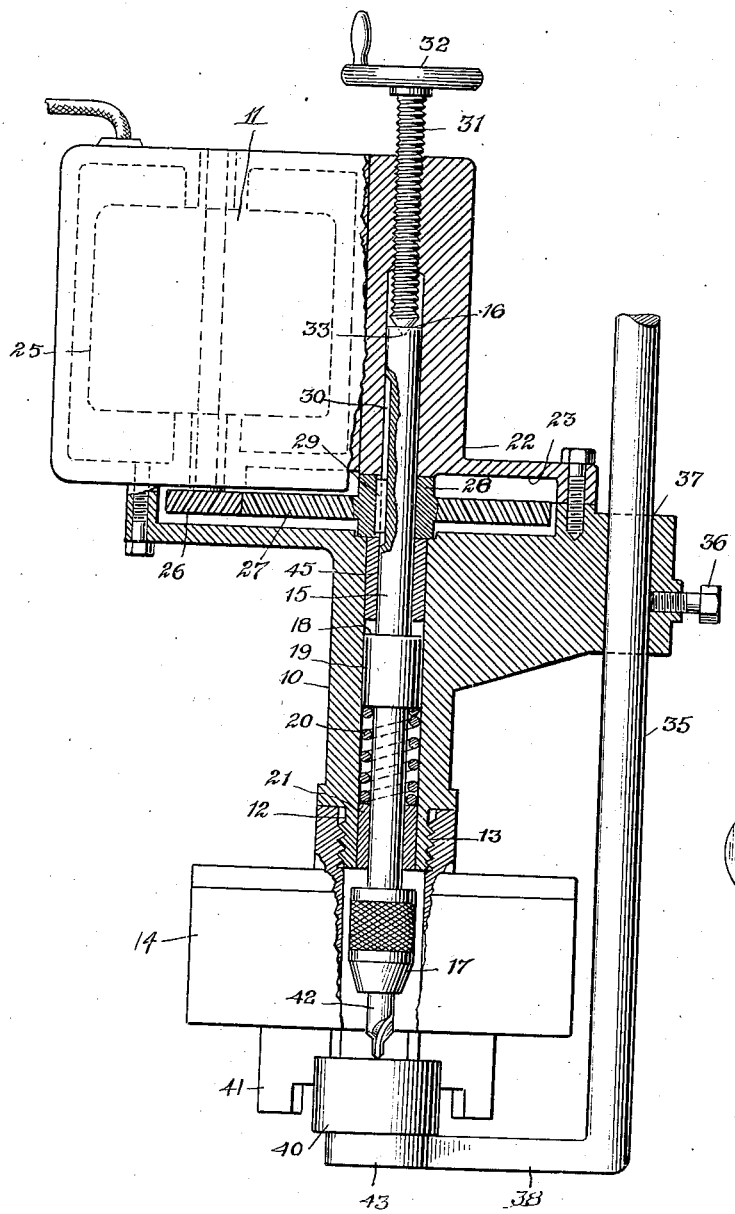

2,269,255

UNITED STATES PATENT OFFICE 2,269,255

COUNTERSINK

Camille H. Duthoit, New York, N. Y.

Application December 21, 1940, Serial No. 371,171

3 Claims. (Cl. 77—18)

This invention relates to a countersink and more particularly to a countersink for use in work which requires great accuracy and which requires the absolute centering of the drill and bit.

An object of the invention is to provide a device for holding the work in such position that it is possible to drill accurately and quickly without danger or sacrificing the accuracy.

Another purpose of this invention is to provide a device of the character described which will be simple in construction and easy to manipulate.

Other objects of the invention will be apparent as the description proceeds.

In the accompanying drawing—

Fig. 1 is a side elevation of a device employing my invention, partly in cross-section to show the construction and operation thereof, and Fig. 2 is an end view of the work-positioning arm.

From the drawing it will be apparent that I provide a housing or countersink holder 10 on which is mounted a motor housing 11. At one end of the housing 10, threads 12 are provided to engage the threads 13 of a three-jaw chuck 14, so that the chuck 14 may be screwed on the threads 12 on the end of the housing 10 to position the chuck with relation to the housing. Extending through the housing is a shaft 15 having at one end a centering depression 16 and at the other end a drill or bit-bearing chuck 17. The shaft 15 is positioned in the bore 18. An enlargement 19 on the shaft 15 centers the shaft and abuts a spring 20 which is positioned in the bore 18 by means of a packing 21. It will be seen that the spring is positioned around the shaft 15 between the enlargement 19 and the packing 21 so that it will normally push the shaft 15 inwardly in the housing.

Mounted on the rear of the housing 10 is the motor casing 11 and a member 22 forming a gear box 23. The motor 25 has a gear 26 which engages a gear 27 mounted on the shaft 15. The hub 28 of the gear 27 is provided with a key 29 which rides in the groove 30 of the shaft 15. The gear 27 is, therefore, keyed to the shaft and while the shaft 15 may slide laterally within the hub 28 it must rotate therewith. A screw 31 with a hand wheel 32 is mounted in the member 23 and has a centering point 33 which engages the depression 16 in the shaft 15. As the screw is rotated inwardly it forces shaft 15 to move toward the chuck 14, the key 29 of the gear 27 sliding in the groove 30.

Mounted in the housing is the work-positioning arm 35, which is positioned by means of a screw 36 in the bore 37. The work-positioning arm 35 has a right-angle extension 38, which is adapted to position the work 40 as it is held in the jaws 41 of the chuck 14.

In operation, the bit 42 is placed in the chuck 17 and the chuck 14 is screwed on the housing 10. The work 40 may then be placed in the jaws 41 of the chuck 14 and the work-positioning arm 35 adjusted so that the end 43 thereof on the right-angle extension 38 engages the work, and the bolt 36 is then tightened and the motor turned on. As the bit 42 cuts into the work, the hand wheel 32 may be rotated to move the bit into the work at whatever speed is desirable and necessary. Because of the position of the shaft 15 and the bushings 21 and 45, the drill will be very accurate and it will be possible to countersink with considerable speed and safety. The action of the chuck 14 positions the work accurately and the arm 35 prevents any movement.

With some types of work it may be desirable to place the work in the chuck 14 before the chuck is screwed on to the housing 10.

With this construction it is possible to operate on not only very hard materials but also very soft materials without danger of damage.

I claim:

1. In a countersink, a housing, a bore in said housing, a threaded end on said housing, a work-holding chuck engaging said threaded end, a shaft positioned in said bore and extending into said chuck, bit-holding means on the end of said shaft, means for rotating said shaft, and additional means for moving said shaft as it is rotated towards said work-holding chuck, said means comprising a screw mounted in said housing and engaging the other end of said shaft.

2. In a device of the character described, a housing, a work-holding chuck positioned at one end of said housing, a drill member in said housing adapted to engage work held by said chuck, means for rotating said drill member, and an additional work-positioning means comprising an arm mounted in said housing, said arm having an angular extension adapted to engage and position said work at a point opposite said drill member.

3. The combination with a countersink including a housing, a drill-bearing shaft mounted in said housing, and means for rotating said shaft, of work-positioning means, said means comprising a chuck member adapted to engage the end of said housing and to position work with relation to said housing and shaft, and an arm adjustably mounted in said housing, said arm having an angular extension adapted to engage said work at a point in line with the action of said drill-bearing shaft.

CAMILLE H. DUTHOIT.